United States Patent
Jin et al.

(10) Patent No.: US 9,740,950 B1
(45) Date of Patent: *Aug. 22, 2017

(54) METHOD AND SYSTEM FOR AUTOMATIC REGISTRATION OF IMAGES

(71) Applicant: Harris Corporation, Melbourne, FL (US)

(72) Inventors: Xiaoying Jin, Boulder, CO (US); Robert Schafer, Boulder, CO (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/002,062

(22) Filed: Jan. 20, 2016

Related U.S. Application Data (63) Continuation of application No. 13/842,946, filed on Mar. 15, 2013, now Pat. No. 9,245,201.

(51) Int. Cl.
*G06K 9/32* (2006.01)
*G06K 9/62* (2006.01)

(52) U.S. Cl.
CPC ......... *G06K 9/3233* (2013.01); *G06K 9/6202* (2013.01); *G06K 9/6211* (2013.01); *G06K 9/6215* (2013.01)

(58) Field of Classification Search
CPC ...... G06K 9/6203; G06K 9/68; G06K 9/6202; G06K 9/32; G06K 9/80; G06K 9/6857; G06K 9/78; G06K 9/4609; G06K 9/6201; G06K 9/6206; G06T 7/001; G06T 2207/20021; G06T 7/0028; G06T 7/0044; G06T 5/50; G06T 7/0081
See application file for complete search history.

(56) References Cited

PUBLICATIONS

A Survey of Image Registration Templates—Lisa Gottesfeld Brown—ACM Computing Surveys, vol. 24, No. 4, Dec. 1992.
Image registration methods: a survey—Barbara Zitova, Jan Flusser—Jun. 26, 2003.
Indirect Epipolar Resampling of Scenes Using Parallel Projection Modeling of Linear Array Scanners—M. Morgan a, K. Kim b, S. Jeong b, A. Habib—2004.
On the Possibility of Automatic Multisensor Image Registration—Jordi Inglada and Alain Giros- IEEE Transactions on Geoscience and Remote Sensing, vol. 42, No. 10, Oct. 2004.

*Primary Examiner* — Bhavesh Mehta
*Assistant Examiner* — Menatoallah Youssef
(74) *Attorney, Agent, or Firm* — Davidson Berquist Jackson & Gowdey LLP (57) ABSTRACT

A computer-implemented method and system register plural images using a computer processor and computer memory, where computer code stored in the computer memory causes the computer processor to perform the registration. The registration includes receiving a reference image; receiving a sensed image; computing an approximate image transformation between the reference image and the sensed image; finding plural candidate tie points by utilizing template matching; applying radiometric filtering to at least a portion of the plural candidate tie points; applying geometric filtering to at least a portion of the plural candidate tie points; computing a calculated image transformation using candidate points of the plural candidate points that were not filtered out by the radiometric and geometric filtering; transforming the sensed image using the calculated image transformation; and registering the sensed image with the reference image.

21 Claims, 7 Drawing Sheets
(1 of 7 Drawing Sheet(s) Filed in Color)

METHOD AND SYSTEM FOR AUTOMATIC REGISTRATION OF IMAGES

FIELD OF INVENTION

The present invention is directed to image registration, and, in one embodiment, to a method and system for automatically registering a sensed image with a reference image.

DISCUSSION OF THE BACKGROUND

Image registration geometrically aligns two images with different viewing geometry and/or different terrain distortions into the same coordinate system so that the corresponding pixels represent the same objects. Geometric relationship between a sensed image and a reference image can often be obtained through a number of tie points, and the relationship between images can be obtained using transformation capabilities. Automatic tie point generation and accurate image-to-image registration improves usability in many applications including georeferencing, change detection and time series analysis, data fusion, the formation of image mosaics, digital elevation model (DEM) extraction, 3D modeling, video compression and motion analysis, etc.

Known image registration methods involve four basic steps: 1) feature selection, 2) feature matching based on a similarity measure, 3) transformation model determination, and 4) image transformation and resampling. Image registration methods provide different combinations of choices for the four components. Comprehensive reviews of image registration methods include: L. Brown, "A survey of image registration techniques," ACM Computing Surveys, vol. 24, no. 4, pp. 325-376, 1992; and B. Zitova and J. Flusser, "Image registration methods: a survey," Image and Vision Computing, vol. 21, pp. 977-1000, 2003. The contents of both of those references are incorporated herein by reference. Reviews on remote sensing applications can be found in: J. Inglada and A. Giros, "On the possibility of automatic multisensor image registration," IEEE Trans. Geosci. Remote Sensing, vol. 42, no. 10, pp. 2104-2120, October 2004. The contents of that reference are incorporated herein by reference.

In manual registration, a human operator utilizes interactive software to visually perform the tasks of locating and matching feature points (called "tie" points) between two images. Tie points act as pairs of points—one from each of the images used in the registration process. The process is repetitive, laborious, tedious and prone to error. Manual registration becomes prohibitive for a large amount of data and a large area.

Remote sensing images, however, have various characteristics that make it difficult to automatically generate tie points and align images. For example, location errors may occur in the navigation and during spacecraft maneuvers. Similarly, atmospheric scattering and absorption affect the fidelity of remote sensing data. Image artifacts may occur due to lens flare, noise or defective pixels. Furthermore, various image characteristics such as multi-temporal effects, terrain effects, different sensor modalities and different spatial resolution all add complexity to automated registration.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following description, given with respect to the attached drawings, may be better understood with reference to the non-limiting examples of the drawings, wherein.

DISCUSSION OF THE PREFERRED EMBODIMENTS

Figure 1:
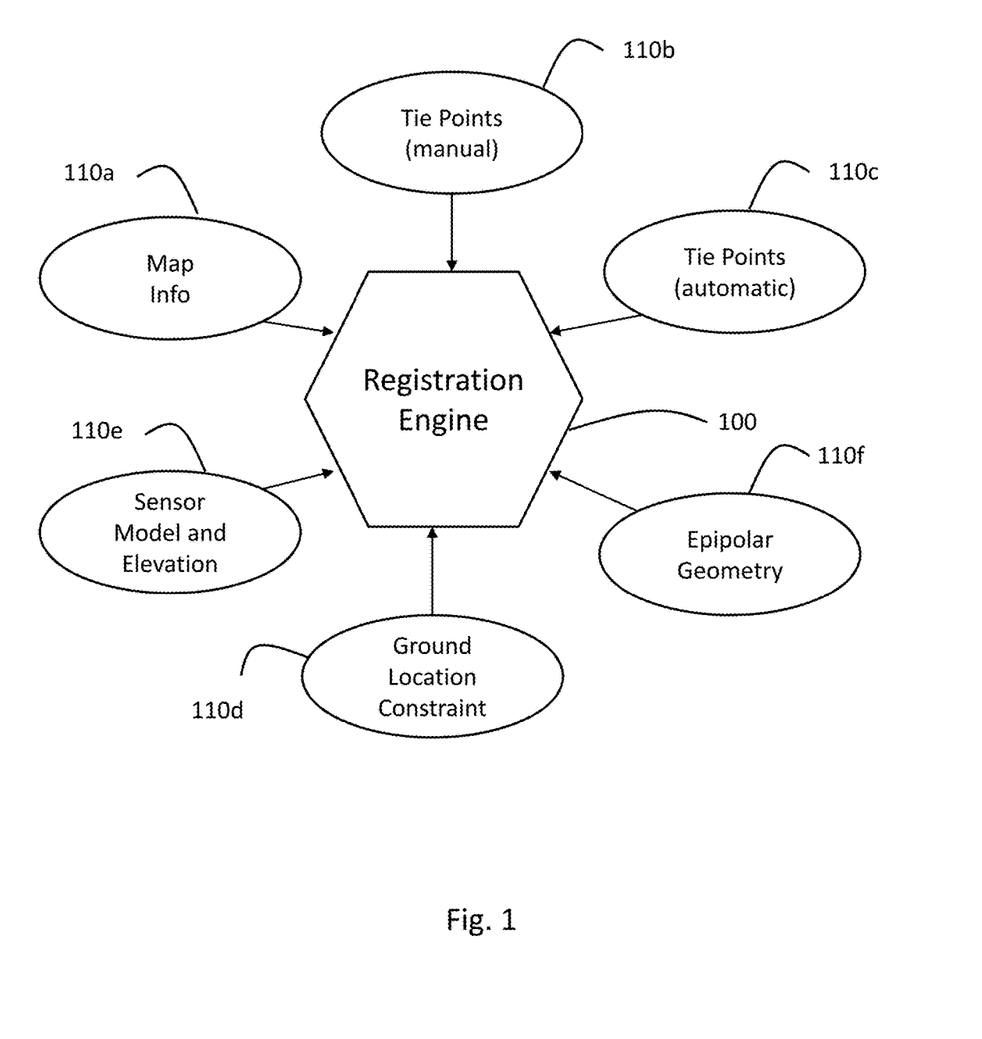
FIG. 1 is a component diagram showing various registration components interfaced to a registration engine utilized to increase the automation of image registration.

Turning to FIG. 1, a component diagram is provided that shows various registration components (110a-110f) interfaced to a registration engine 100 utilized to increase the automation of image registration. The components are adaptively selected to improve registration using available spatial references, information about the images, and optional user input. In one embodiment, users can automate image registration in a batch-processing environment. In another embodiment, users can additionally incorporate image registration into other automated production systems, such as an automated change detection system. In such a system, the automated image registration can be a pre-processing component to align the images before performing change analysis.

The first possible registration component is a map information component 110a which may include standard map information, Rational Polynomial Coefficients (RPC) information or other map information for input images. The information from the map information component 110a can establish the approximate geometric relationship between a sensed image and a reference image, thus reducing the search space and improving the reliability of automatic tie point generation.

Other possible registration components are manual tie point information 110b manually defined by an operator and automatically generated tie point information 110c from image matching techniques. In one embodiment, automatic generated tie point information 110c may be generated based on a small number of manually specified seed tie points that are fed into an automatic tie point generation system to improve the overall accuracy.

The ground location constraints 110d utilizes geo-location geometric constraints to search for and filter tie points. The images should align well in the common ground coordinate space in the orthorectified images or nadir view images;

therefore, all the tie points are constrained by a global transformation between the coordinates in the reference image and the sensed image.

The sensor model registration component 110e utilizes sensor models and elevation for on-the-fly orthorectification during image registration. The sensor models include, but are not limited to, RPC, Replace Sensor Model (RSM) and Community Sensor Model (CSM). This geometrically corrects the data to a common ground coordinate space, and it achieves better accuracy in automatic tie point finding and filtering. The tie points can be automatically generated even in the image areas with big distortion due to terrain relief, such as mountainous areas.

For images taken at different viewing positions and/or angles, the images of the same scene are related by the epipolar geometry constraint as specified by the epipolar geometry registration component 110f. For a feature point in the first image, the corresponding point in the second image must lie on the epipolar line or curve. Either of two epipolar geometry models can be used in geometric filtering: one is suitable for the imagery with the frame central projection, and the other is suitable for the imagery obtained with a pushbroom sensor that has RPC information.

Figure 2:
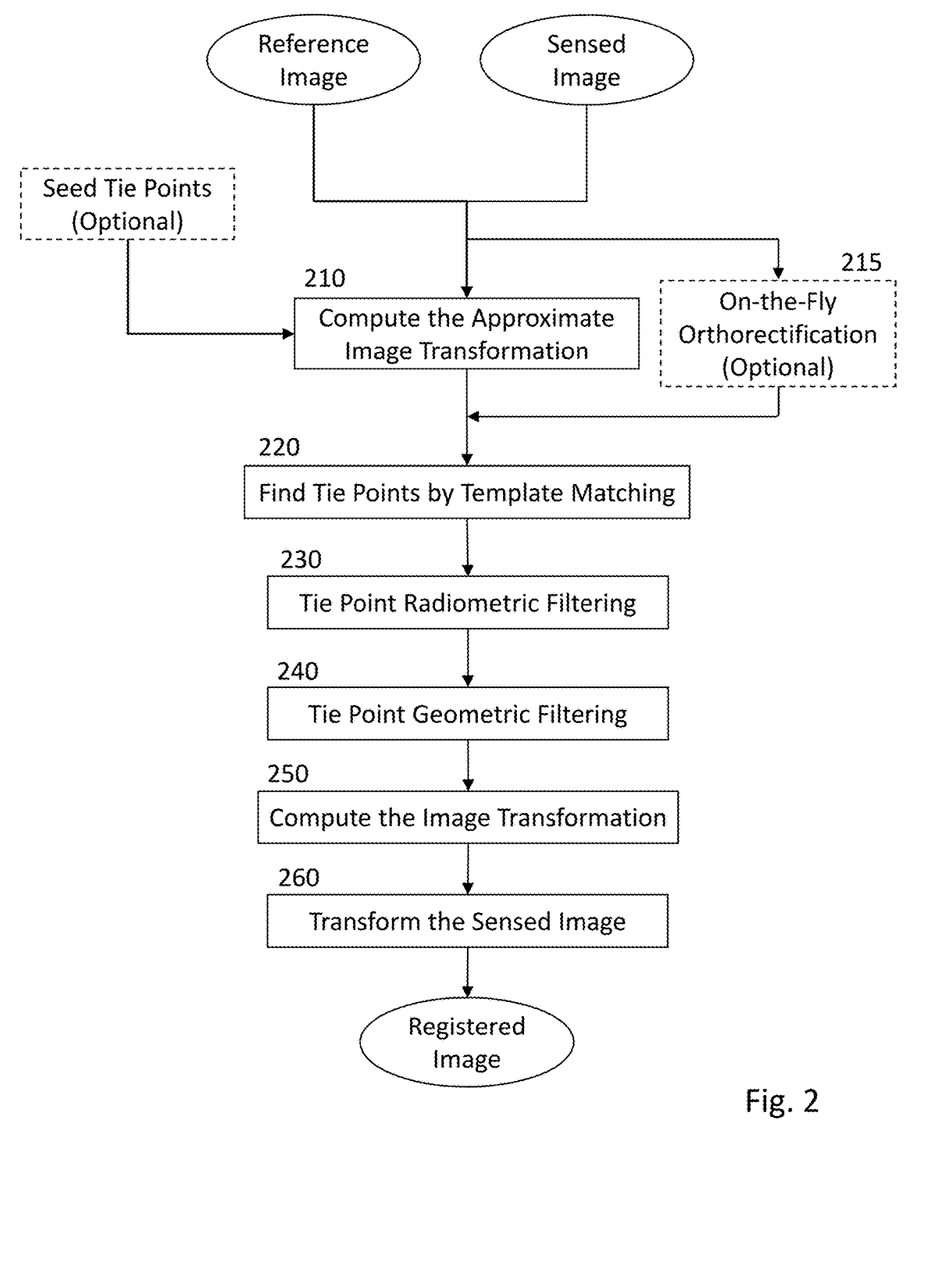
FIG. 2 is a flowchart of an image registration method according to the present invention.

FIG. 2 is a flowchart of an image registration method according to the present invention for registering a sensed image with a reference image. First, in step 210, the approximate image transformation is computed from the map information of the input images, or from the seed tie points defined by an operator, or from a fast Fourier-based image matching method. The images may be pre-processed to remove optical or other geometric distortion. Then a grid is initialized in the reference image. In step 220, for each grid, one or a few interest points are found in the reference image using an interest operator. For each interest point in the reference image, a template matching method finds a point located at the same feature in the sensed image. Each tie point is assigned a matching score to represent how much the point in the sensed image matches the corresponding point in the reference image.

If the reference image or the sensed image includes RPC information, a DEM file can further improve the accuracy of the results. The present invention performs on-the-fly orthorectification on the image templates and generates and filters tie points in the common ground coordinate space (step 215).

After all candidate tie points are located in all grid cells, the bad tie points (outliers) are automatically filtered. In step 230, radiometric filtering is performed so that the grey scale pattern of the two templates should match. In step 240, geometric filtering is performed so that the tie point coordinates in the image pairs are related by a geometric transform. After the outliers are removed, in step 250, the image transformation is computed using the tie points. In step 260, the sensed image is to align to the reference image using the computed transformation.

As described above, step 210 computes the approximate image transformation between the reference and sensed images. The method assumes that the approximate geometric relationship between the sensed image and the reference image is known or can be computed. Knowing the relationship can reduce the search space to find the tie points and improve the reliability of automatic tie point generation. For input images with standard map information, RPC information, or other types of map information, the map information establishes the transformations between the map coordinates and the pixel coordinates.

Figure 3:
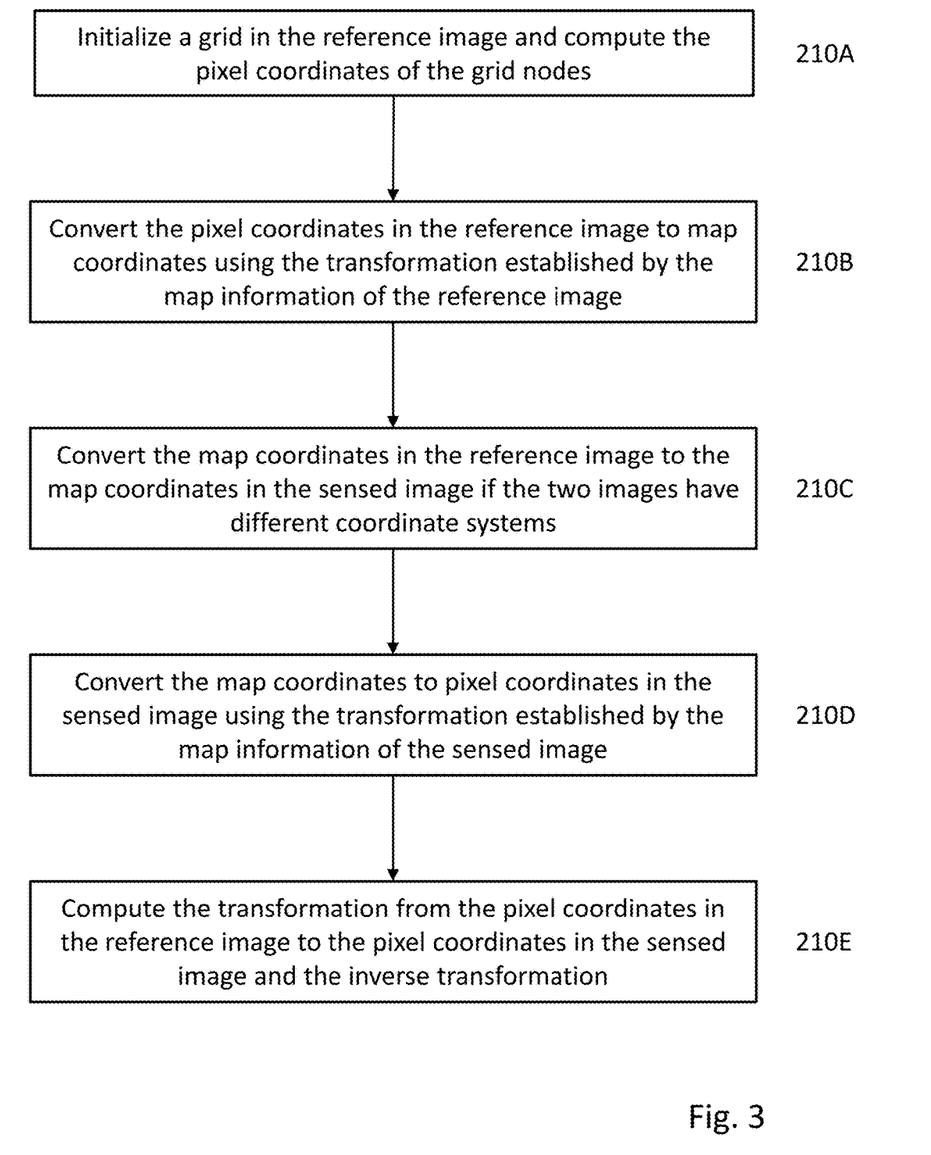
FIG. 3 is a flowchart showing how the approximate image transformation is computed.

From the transformations of the reference image and the sensed image, the approximate geometric relationship between a sensed image and a reference image can be found using the steps of FIG. 3. In step 210A, a grid in the reference image is initialized, and the pixel coordinates of the grid nodes are calculated. In step 210B, the pixel coordinates in the reference image are converted to map coordinates using the transformation established by the map information of the reference image. In step 210C, the map coordinates in the reference image are converted to the map coordinates in the sensed image if the two images have different coordinate systems. In step 210D, the map coordinates are converted to pixel coordinates in the sensed image using the transformation established by the map information of the sensed image. Lastly, in step 210E, the system computes the transformation from the pixel coordinates in the reference image to the pixel coordinates in the sensed image and the inverse transformation. The transformation can be simple rotation, scaling and translation (RST) transformation, affine transformation, first-order or higher-order polynomial transformation, or perspective transformation.

If one of the reference or sensed images is pixel-based, at least three seed tie points need to be selected to define the approximate relationship between the two images. The tie points have the pixel coordinates in both the reference image and the sensed image. From those pixel coordinates, the transformation between the pixel coordinates in the sensed image and the pixel coordinates in the reference image can be estimated. If only three tie points are selected, the only transformation that can be chosen is RST transformation. If the reference image and the sensed image cover a similar imaging area and they are related by a RST transformation, a Fourier-based image matching method can be used to find the transformation between the reference image and the sensed image, as may be done in medical image registration.

As described with respect to FIG. 2, in step 220, the system finds tie points by template matching. To find the tie points, the present invention starts from finding the interest points in the reference image. The interest points are extracted on distinctive feature points such as building corners, road intersections, salient point features, etc. with pixel or sub-pixel accuracy. Any of a number of interest point operators (e.g., Moravec, Harris, Forstner, Susan, etc.) can be used to find the distinctive feature points from the reference image.

To model the local geometric transform between the reference image and sensed image, the tie points are preferably distributed across the images. The present invention initializes a grid based on the number of tie points requested in the reference image. For each grid cell, an interest operator locates one or a few distinct points, and it selects points with the highest interest values.

Figure 4A:
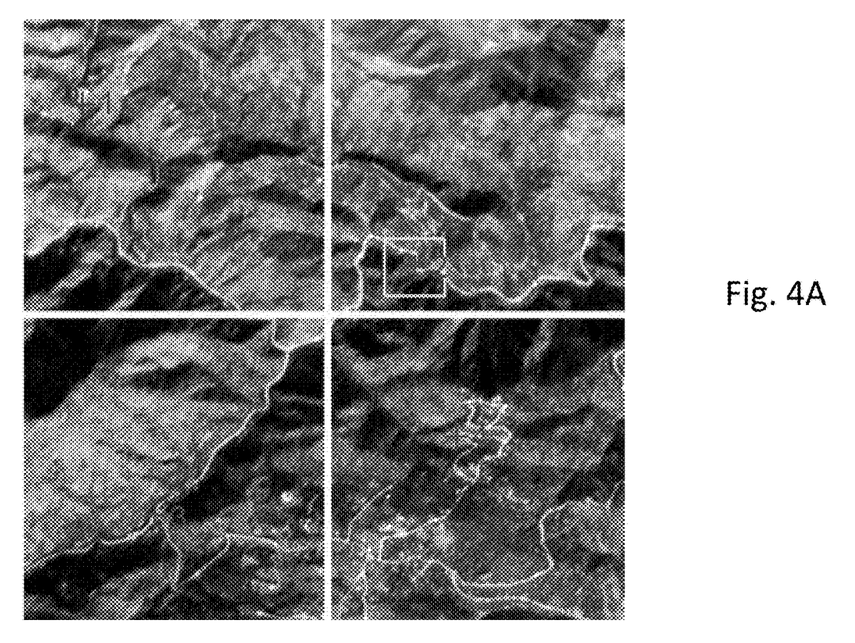
FIGS. 4A and 4B are a reference image and a sensed image, respectively, in which matching of points of interest is performed.
Figure 4B:
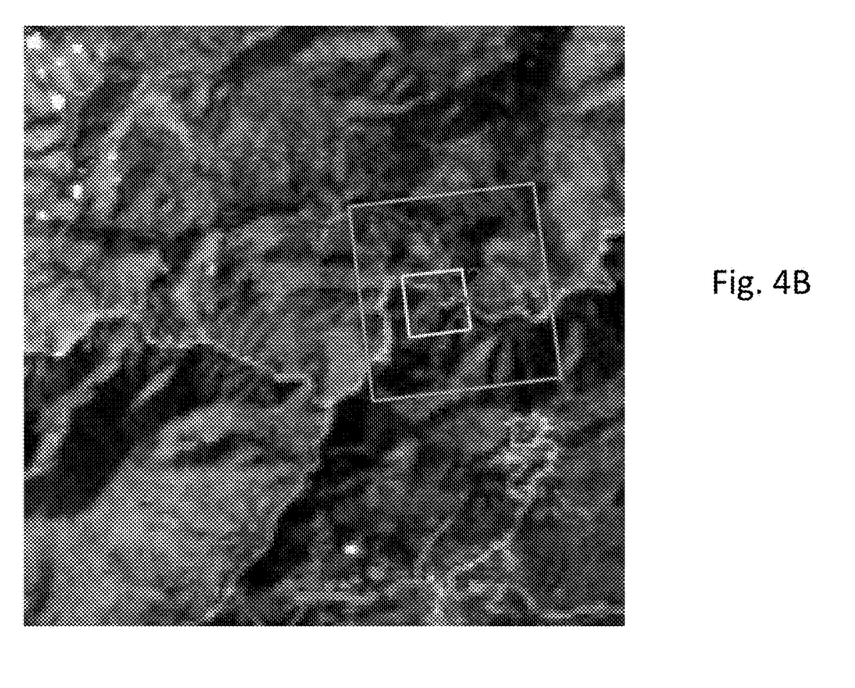

For each interest point in the reference image (Point #2 in FIG. 4A), the present invention finds the corresponding match point in the sensed image. Since the approximate image transformation is available, the location of the match point in the sensed image can be estimated by transforming the pixel coordinates in the reference image to the pixel coordinates in the sensed image. The match point location in the sensed image is refined by template matching in a search window (outer, green box in FIG. 4B) centered at the estimated match point (Point #2' in FIG. 4B) in the sensed image. (In an alternate embodiment, the window need not be centered but may be at any other location relative to an estimated match point.)

Limiting the search space makes it faster to find the match point, and it reduces the opportunity to find points with a similar pattern but in a different location. For automatic tie point generation, a window around the interest point in the reference image is used as a template image (inner yellow box in FIG. 4A). The matching window size is $W_M$. The estimated match point in the sensed image is computed by the approximate image transformation. Based on the estimated local geometric distortion, a search window size Ws is given.

It is estimated that a search window size of 255 pixels is suitable for most remote sensing images. The search window (outer, green box in FIG. 4B) is a subset of the sensed image that finds feature matches for tie point placement. Increasing the search window size may produce more matches, but it increases processing time. If the pixel offset of the same features in the two images is greater than the search window size, the search will not detect and match corresponding features. The algorithm reads from the sensed image centered at the estimated match point, with a size of $W_M + W_S$. The search window is warped to the coordinates of the reference image using the inverse image transformation. The algorithm iterates through each candidate match point in the search window and computes the matching score between the template window in the reference image and the template window centered at the candidate match point in the sensed image. (In an alternate embodiment, the window need not be centered but may be at any other location relative to an estimated match point.)

The pixel location (Point #2 in FIG. 4B) in the sensed image with the maximum matching score is identified as the point matched to the interest point in the reference image, and a tie point is recorded. All candidate tie points are found by iterating through all interest points in the reference image.

To speed up the template matching process, a hierarchical search can be adopted. A user can set the maximum search level l. The downsampling factor for level i is:

$$ds\_factor = 2^i \quad (1)$$

The search starts from the highest image pyramid level l, which has the lowest spatial resolution. The search window at the highest level is reduced to $W_S/2^l$, and the matching window at the highest level is reduced to $W_M/2^l$. The process first finds the match point in the pyramid level l of the sensed image. This location $[p_{lx}, p_{ly}]$ at level l of the sensed image is used as a starting search location at level l−1. The search window at level l−1 can be a small window (e.g. 5×5) centered at the $[2p_{lx}, 2p_{ly}]$. The computational time is significantly reduced by a hierarchical search approach, especially if the search window or the matching window is large.

Figure 5:
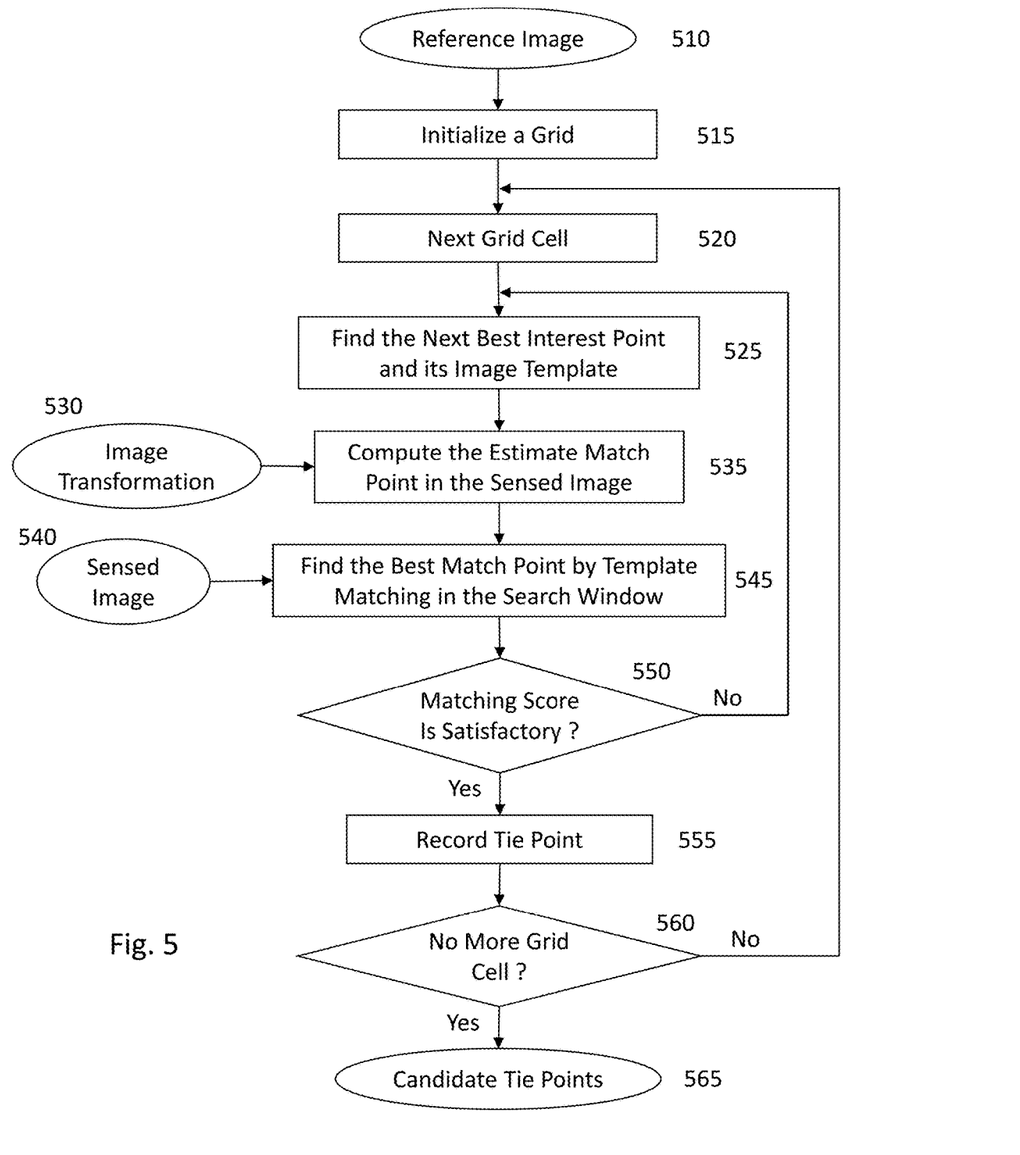
FIG. 5 is a flowchart showing how tie points are found utilizing template matching with a multi-trial technique.
Figure 6A:
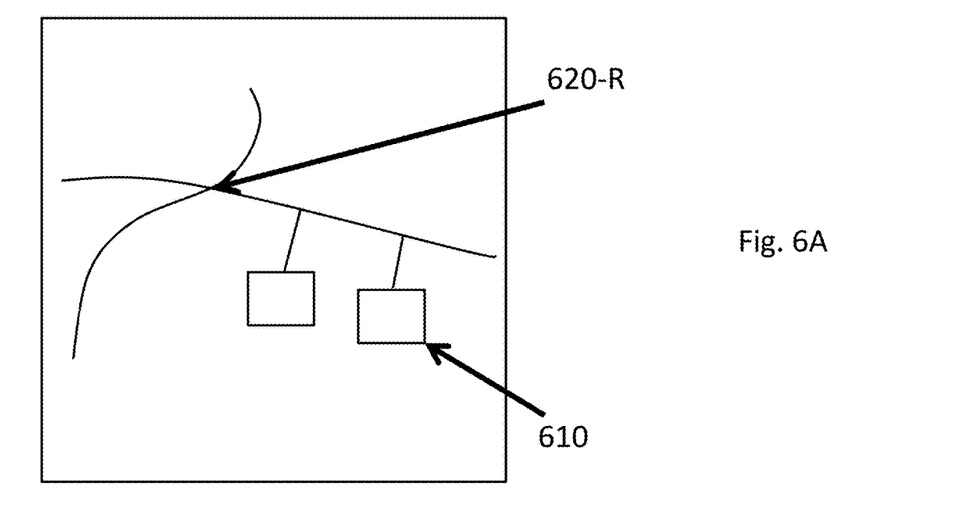
FIG. 6A is a sub-portion of a reference image that includes two points of interest.
Figure 6B:
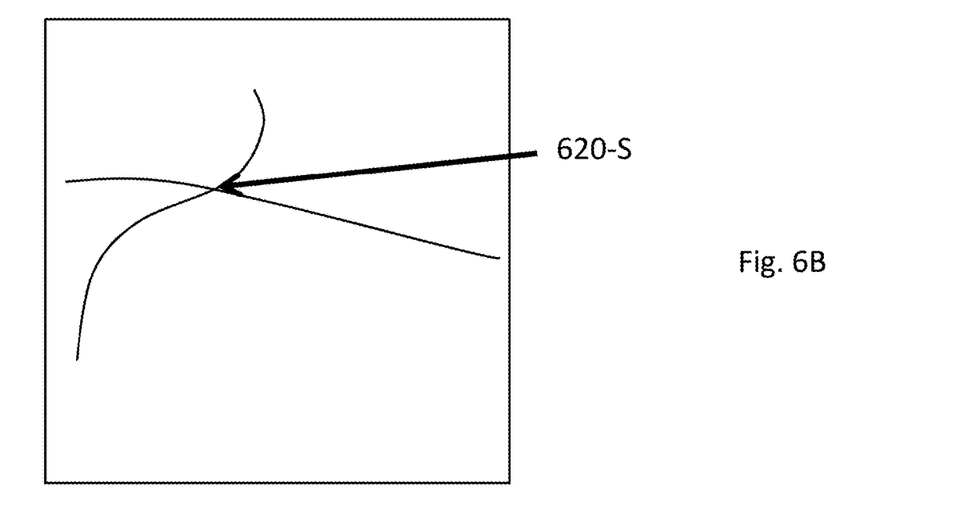
FIG. 6B is a sub-portion of a sensed image corresponding to the sub-portion of the reference image of FIG. 6B but with only one of the points of interest of FIG. 6A.

FIG. 5 is a flowchart showing how tie points are found utilizing template matching with a multi-trial technique. The interest points are selected from the reference image, and then the location of match points are found in the sensed image by template matching. However, the interest points with the highest interest value do not necessarily have the best match to the sensed images. For example, if the feature at an interest point does not exist in the sensed image, then template matching will fail, and next best interest points will have to be tested instead. For example, FIGS. 6A and 6B show a portion of a reference image and a sensed image, respectively. FIG. 6A corresponds to a single grid (e.g., a grid from FIG. 4A), and FIG. 6B shows its corresponding part in the sensed image. FIG. 6A includes two points of interest: a best point of interest 610 (e.g., a corner of a building) and a next best point of interest 620-R (e.g., the intersection of two roads). As the sensed image does not include a point corresponding to the best point of interest 610, the system will instead look for a point corresponding to the next best point of interest 620-R. The corresponding point in the sensed image is shown as 620-S.

In general, a reference image is received in step 510 that includes a number of interest points. In step 515, a grid is selected that includes a number of interest points, and that grid is utilized to search for possible matches. In step 520, the next grid cell to be used is selected, and in the case of the first run through the loop, it is the first grid that was just initialized. In step 525, the best remaining interest point in the current grid is selected, and in step 530 the image transformation is received. In step 535, the location of the estimated match point in the sensed image is computed. The corresponding portion of the sensed image (the search window) is received in step 540, and the best match point in the search window is calculated in step 545. Step 550 determines if the calculated potential match has a sufficiently satisfactory matching score, and if so the point is recorded in step 555. If not, control passes back to step 525 to determine the next best interest point so that its score can be calculated. After control passes from step 555 which recorded a tie point with a satisfactorily matching score, control passes to step 560 to determine if there are additional grids with potential interest points to be processed. When no additional grid cells are left, the system indicates in step 565 the candidate tie points.

As described above with respect to FIG. 5, a multi-trial strategy can be utilized to improve image matching. A user sets a minimum matching score value. If the matching score is lower than this threshold value, the template matching fails, and the method will perform multiple trials in that grid cell to find a better tie point. If the match point is not found in the sensed image for the current interest point, the point with the next highest interest value in the same grid cell will be used as the new interest point to start another trial of tie point finding, as shown in step 525. If the match point is found, the multi-trial process stops and the tie point is recorded. In one embodiment of the multi-trial method, at step 550, if the number of trials in the current grid cell reaches a maximum allowable number, such as 4, the process stops and no tie point is found in that grid cell. This strategy would help in the cases where two images have significantly different content due to changes in vegetation, season and/or viewing angle, etc.

As shown in Table 1, it is possible to increase the number of candidate tie points by utilizing the above-referenced multi-trial process. To generate Table 1, a few multi-temporal National Agriculture Imagery Program (NAIP) images and air photos from different viewing points were used as experimental examples, and possible candidates were determined. Scenes were significantly different due to large vegetation areas and the multi-temporal, multi-viewpoint effect. By using a multi-trial strategy, the number of tie points measurably increased for those cases.

| Trial information | Candidate search type | No. of tie pts. requested | No. of tie pts. found |
|---|---|---|---|
| NAIP image pair #1 | single trial | 121 | 29 |
| NAIP image pair #1 | multi-trial | 121 | 64 |
| NAIP image pair #2 | single trial | 121 | 29 |
| NAIP image pair #2 | multi-trial | 121 | 64 |
| Air photo pair #1 | single trial | 840 | 138 |

-continued

| Trial information | Candidate search type | No. of tie pts. requested | No. of tie pts. found |
|---|---|---|---|
| Air photo pair #1 | multi-trial | 840 | 292 |
| Air photo pair #2 | single trial | 810 | 146 |
| Air photo pair #2 | multi-trial | 810 | 274 |

To match the template image in the sensed image to the template image in the reference image, a similarity measure needs to be defined to calculate the matching score between the two templates. Many applications need to register images from the same imaging sensor or modality, such as video compression and motion analysis, DEM extraction, 3D modeling, image mosaicking, change detection and time series analysis, etc. Since the brightness of the image and template can vary due to lighting and exposure conditions, normalized cross-correlation is used as the similarity measure to register images of the same modalities. The normalized cross-correlation of a template S in the sensed image with a template R in the reference image is expressed as:

$$NCC(S, R) = \frac{1}{n}\Sigma_{x,y} \frac{(S(x, y) - \overline{S})(R(x, y) - \overline{R})}{\sigma_S \sigma_R} \qquad (2)$$

where
n is the number of pixels in S and R;
$\overline{S}$ is the average pixel value of the template S and $\sigma_S$ is the standard deviation of S; and
$\overline{R}$ is the average pixel value of the template R and $\sigma_R$ is the standard deviation of R.

Based on the image registration applications, other similarity measures can be used to register images of the same modality. Examples include cross-correlation, sum of squared differences, sum of absolute difference, maximum of absolute difference, etc.

Other applications need to register images with different modalities, to integrate complementary information from different sensors and to help the decision-making process. For example, in remote sensing, automatically registering images from visible, thermal, radar, and LiDAR sensors supports a full portfolio of data fusion and multi-intelligence applications. In medical imaging, the combination of information from multiple image modalities—such as magnetic resonance (MR) imaging, computed tomography (CT), positron emission tomography (PET), single-photon emission computer tomography (SPECT), and ultrasound—is of increasing interest for physiologic understanding and diagnostic purposes.

Registering multi-modality images is a challenging problem since the image characteristics between different modalities are very different. In the present invention, normalized mutual information is used as the similarity measure to register images with different modalities (e.g., registering SAR with optical images, thermal with visible images in remote sensing, MR with CT in medical applications, etc.). Mutual information produces more accurate results than the traditional correlation-based measures for cross-modality image registration. The normalized mutual information method takes longer to run since it is more computationally intensive. However, it is more robust to generate tie points from images with different modalities.

The Shannon entropy of a template T is expressed as:

$$H(T) = -\Sigma_t p(t)\log(p(t)) \qquad (3)$$

where p (t) is the distribution of the image's grey value. The normalized mutual information of a template S in the sensed image with a template R in the reference image is expressed as:

$$NMI(S, R) = \frac{H(S) + H(R)}{H(S, R)} \qquad (4)$$

where H(S,R) is the joint entropy of the template S and the template R expressed as:

$$H(S,R) = -\Sigma_{s,r} p(s,r)\log(p(s,r)) \qquad (5)$$

where p(s,r) is the joint distribution of the template images' grey values.

Other similarity measures that can be used to register images with different modalities are mutual information and its variants, redundancy, Kullback divergence, etc.

To make the image registration method fully automated, normalized cross-correlation is used as the similarity measure by default. The present invention also reads the metadata from the input images. If the input images have different modalities (e.g., optical versus SAR), the method automatically selects normalized mutual information as the similarity measure to improve accuracy.

As described above with reference to step 230 of FIG. 2, the present invention utilizes radiometric filtering of candidate tie points. To do so, the minimum matching score value is used to automatically filter tie points based on radiometric criteria. For automatic tie point generation, the windows centered at the tie point location are used as matching templates. Depending on the similarity measure chosen, the normalized cross-correlation or normalized mutual information between the template in the sensed image and the template in the reference image is computed as the matching score. The higher the matching score, the closer the grey scale patterns in the image patches match. If the matching score is low, it is very likely that the tie point is false. The tie points with a matching score less than the minimum matching score value are considered as outliers and are removed. When normalized cross correlation is used as matching method, the default value of the minimum matching score is 0.6 for most image pairs. If the image pairs have a large parallax, have different modalities, or have noise or other artifacts, it is likely that the matching score is low, so this threshold value is automatically reduced to a lower value such as 0.4.

As described above with reference to step 240 of FIG. 2, the present invention may also utilize geometric filtering of candidate tie points, in addition to or in place of the radiometric filtering of candidate tie points. While it is preferable to perform the radiometric filtering before the geometric filtering, as shown in FIG. 2, it is possible to reverse the order of those steps.

To perform geometric filtering of tie points, as in step 240. A tie point common to two image has different 2D image coordinates of the same 3D point. In the present invention, three geometry models describing global transformations, frame cameras, and pushbroom sensors are used to filter tie points. Based on the metadata of input data, one of the geometry models is selected automatically for tie point filtering. For images obtained with pushbroom sensors that contain RPC information, the epipolar geometry model of pushbroom sensors is selected. For images taken by frame cameras, the epipolar geometry model of frame cameras is selected. For other cases, a global transformation-based geometric model is selected. For medical imaging, the epipolar geometry model of frame cameras is suitable for most applications.

As described above with reference to step 250 of FIG. 2, the present invention calculates the image transformation from the filtered set of candidate tie points resulting after performing steps 220, 230 and 240. When using a global transformation-based geometric model, the images should align well in the common ground coordinate space in the orthorectified images or nadir view images; therefore, all the tie points are constrained by a global transformation between the coordinates in the reference image and the sensed image. For orthorectified images, nadir, or near-nadir images, the transformation model between the reference image and the sensed image should fit a RST transformation. When the scene is rather flat and the sensor is far from the scene, the transformation model between the reference image and the sensed image fits a first-order polynomial transformation. For those cases, a global transformation is suitable.

The error measurement comes from the calculated error distance of the tie point from the predicted location. The predicted location is computed based on fitting a RST transformation or a first-order polynomial transformation from points on the reference image to points on the sensed image. The error measurement in the orthorectified space reflects the location accuracy of the tie points. Higher errors indicate tie points that do not fit a global transformation, and those outliers will be removed.

When using a global transformation-based geometric model, the maximum error to allow for each tie point should be specified. The tie point with the largest error distance from the predicted location is iteratively removed until no tie points have an error greater than this value. The default value is 5 pixels. Setting this to a higher value keeps more tie points with larger fitting errors.

The total root mean square (RMS) error is calculated as the root mean square of the error for all tie points. If the overall RMS error of the geometric model is larger than a threshold (e.g., 10 pixels), or the number of inlier tie points after filtering is less than a percentage of the number of tie points requested or less than a preset number, then the geometric model is inappropriate and another geometric model should be considered.

For images taken at different viewing positions and/or angles, the images of the same scene are related by the epipolar geometry constraint. For a feature point in the first image, the corresponding point in the second image must lie on the epipolar line or curve. The present invention uses this information to filter tie points automatically. Two epipolar geometry models are used in geometric filtering: one is suitable for the images taken by frame cameras, and the other is suitable for the images obtained with pushbroom sensors that have RPC information.

In a pinhole camera model, the fundamental matrix F is a 3×3 matrix that relates corresponding points in image pairs. If $x_1$ and $x_2$ are the homogeneous image coordinates of the same 3D point in the reference image and sensed image, they must satisfy the following criterion:

$$x_2^T F x_1 = 0 \qquad (6)$$

With $x_1$ and $x_2$ known, this equation is linear in the entries of the matrix F. Having at least eight tie points is generally sufficient to determine a unique solution for F, defined up to a scale factor. This approach, known as the eight point algorithm, was introduced by Longuet-Higgins in 1981. The key to success with the eight point algorithm is proper normalization of the input data before constructing the equations to solve. A Sampson distance provides a first-order approximation to the geometric error of each tie point and is expressed as:

$$\frac{(x_2^T F x_1)^2}{(Fx_1)_0^2 + (Fx_1)_1^2 + (F^T x_2)_0^2 + (F^T x_2)_1^2} \qquad (7)$$

The overall Sampson cost function is the summation of Sampson distance for all tie points.

After tie point finding by template matching, outliers will typically exist among the generated tie points. Sometimes template matching finds a false match point that is not at the same 3D point. Those outliers will worsen the estimation of the fundamental matrix. To provide a robust estimation of the fundamental matrix from tie points with outliers, an improved Least Median of Squares (LMedS) estimator in the present invention uses an iterative optimization technique. The robust estimator of fundamental matrix is described below:

a) Given n tie points, the algorithm draws m random subsamples of p=8 different point correspondences. Assuming that the tie points contain up to a fraction of $\epsilon$ of outliers, the probability that at least one of the m subsamples is good is expressed as (Rousseeuw 1987):

$$P = 1 - [1 - (1-\epsilon)^p]^m \qquad (8)$$

By requiring that P must be near 1 (e.g., P=0.98), the minimum number of subsamples m can be determined for a given value of $\epsilon$. For example, m=231 if $\epsilon$=40%.

b) For each subsample, indexed by k, use the normalized eight point algorithm to estimate the fundamental matrix $F_k$.

c) Compute the Sampson distance for each tie point using $F_k$, and find the median of Sampson distance for all tie points $M_k$.

d) Loop through all m subsamples. Find the subsample that has the minimum median of Sampson distance. The robust standard deviation estimate is expressed as:

$$\hat{\sigma} = 1.4826 \left[1 + \frac{5}{n-p}\right] \sqrt{M} \qquad (9)$$

where $M = \min(M_k)$.

e) Remove outliers from the tie points. A tie point is determined as an outlier if its Sampson distance is larger than $(2.5\hat{\sigma})^2$.

f) Repeat steps a)-e) for a few iterations. The iterative process stops if the number of iterations reaches a preset number (e.g., 10) or the Sampson cost is less than a threshold.

g) Use the eight point algorithm to determine the fundamental matrix using the remaining good tie points (inliers).

While the above-referenced iterative optimization technique can be used in geometric filtering, other techniques, such as Random Sample Consensus (RANSAC) can be used in alternative embodiments.

After a robust estimation of the fundamental matrix, the epipolar lines can be computed. For a point $x_1$ in the reference image, the epipolar line in the sensed image is estimated by $Fx_1$. For a point $x_2$ in the sensed image, the epipolar line in the reference image is estimated by $F^T x_2$. The reprojection error $d_1$ for a point $x_1$ in the reference image is calculated as the perpendicular distance of $x_1$ from its corresponding epipolar line $F^T x_2$. The reprojection error $d_2$ for a point $x_2$ in the sensed image is calculated as the perpendicular distance of $x_2$ from its corresponding epipolar line $Fx_1$. The reprojection error of a tie point, indexed by i is calculated as:

$$e_i = \sqrt{\frac{d_{1i}^2 + d_{2i}^2}{2}} \quad (10)$$

The overall RMS error of the epipolar geometry model is the root mean square of the distances of all tie points from their estimated epipolar line. It is expressed as:

$$e = \sqrt{\frac{\Sigma_i(d_{1i}^2 + d_{2i}^2)}{2n}} \quad (11)$$

If the overall RMS error of the epipolar geometry model is larger than a threshold (e.g., 10 pixels), or the number of inlier tie points after filtering is less than a percentage of the number of tie points requested or less than a preset number, then the geometric model is inappropriate and another geometric model should be considered. If the geometric model is appropriate, a tie point is classified as an outlier and removed if its reprojection error is larger than a threshold (e.g., 10 pixels).

A pushbroom sensor has a line of sensors arranged perpendicular to the flight direction of the spacecraft. Each scan line is independent. Different areas of the surface are imaged as the spacecraft flies forward. Along a line, the model is the same as a pinhole camera model.

For images obtained by a pushbroom sensor, the parallel projection method estimates the epipolar geometry between image pairs. The parallel projection method requires tie points and an image to ground function (RPC information). The parallel projection model is described by M. Morgan (2004). The parallel projection model involves the following parameters: (1) two components of the unit projection vector (L, M); (2) orientation angles of the scene plane ($\omega$, $\phi$, $\kappa$); (3) two shift values ($\Delta x$, $\Delta y$); and (4) scale factor (s).

The non-linear form of the parallel projection model relating an object point to its scene point is expressed as:

$$\begin{bmatrix} x \\ y' \\ 0 \end{bmatrix} = s\lambda R^T \begin{bmatrix} L \\ M \\ N \end{bmatrix} + sR^T \begin{bmatrix} X \\ Y \\ Z \end{bmatrix} + \begin{bmatrix} \Delta x \\ \Delta y \\ 0 \end{bmatrix} \quad (12)$$

where (X, Y, Z) are the object coordinates of the points of interest;

(x, y') are scene coordinates of the corresponding points;

R is the rotation matrix between the object and scene coordinate systems;

N is the Z-component of the unit projection vector, i.e., $N = \sqrt{1-L^2-M^2}$; and $\lambda$ is the distance between the object and image points, which can be computed from the third equation in (12).

The linear form of the parallel projection model is derived by eliminating $\lambda$ from Equation (12). It can be expressed as:

$$\begin{cases} x = A_1 X + A_2 Y + A_3 Z + A_4 \\ y' = A_5 X + A_6 Y + A_7 Z + A_8 \end{cases} \quad (13)$$

where $A_1$ to $A_8$ are linear parallel projection parameters and are denoted as 2-D Affine parameters.

A Perspective to Parallel (PTP) transformation of the image coordinates is needed before working with the parallel projection model. A PTP transformation applies to each scan line and converts the image coordinates along the scan lines to make then confirm to the parallel projection:

$$y' = y \frac{1}{1 - \frac{y}{c}\tan(\psi)} \quad (14)$$

where c is the scanner principal distance, $\psi$ is the scanner roll angle, and y', y are the coordinates along the scan line according to parallel and perspective projections, respectively. By combining the linear form of parallel projection (Equation 13) and the PTP transformation (Equation 14), we can estimate $A_1$ to $A_8$ and the scanner roll angle together.

$$\begin{cases} x = A_1 X + A_2 Y + A_3 Z + A_4 \\ y = \frac{A_5 X + A_6 Y + A_7 Z + A_8}{1 + \frac{\tan(\psi)}{c} A_5 X + A_6 Y + A_7 Z + A_8} \end{cases} \quad (15)$$

An epipolar geometry may be estimated using the following steps:

(a) Given RPC information for a stereo image pair, the 3D object coordinates (X,Y,Z) are calculated through stereo intersection.

(b) For each image, estimate the non-linear form of the parallel projection model, linear form of the parallel projection model and the scanner roll angle using Equations (12) and (15).

(c) For the image pairs, apply a perspective to parallel transformation to each scan line. Once the parallel projection parameters have been estimated, normalize the images so that the epipolar lines are parallel and correspond to the same scan line in each image.

(d) For each image, calculate the epipolar transformation and the inverse epipolar transformation between the original image and the epipolar image.

After estimating the epipolar geometry, given a point in one image, the epipolar line in the other image can be estimated. The reprojection error for a point in the reference image and that of a match point in the sensed image can be calculated in a similar way to that for epipolar geometry model of frame cameras. The reprojection error of a tie point and the overall RMS error of the epipolar geometry model can be calculated using Equations (10) and (11).

The accuracy evaluation of the geometric model and the criteria to filter the tie points are similar to what was described above with respect to the epipolar geometry model of frame cameras.

Figure 7:
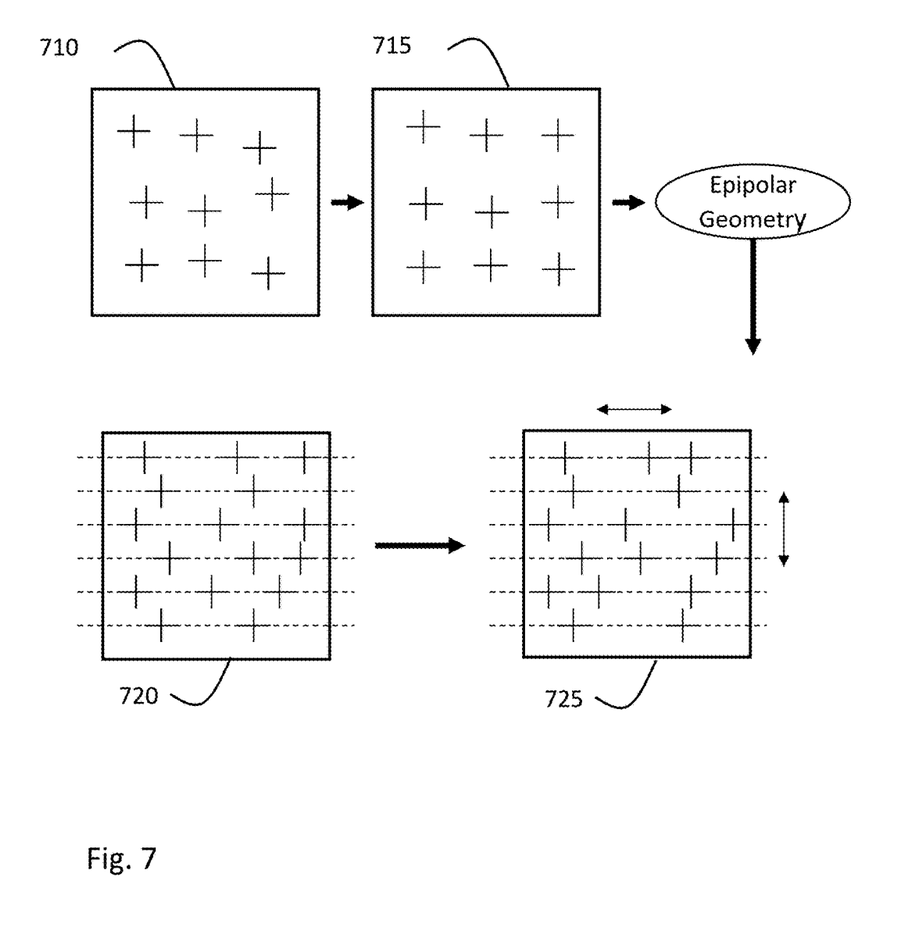
FIG. 7 is a data flow diagram showing a process of rectifying images, finding interest points along scan lines in the reference image and finding match points along horizontal epipolar lines in the sensed image.

In an alternate embodiment, as shown in FIG. 7, it is possible to perform additional tie point finding and filtering if an epipolar geometry model is estimated. If two images are taken from different viewing angles or from off-nadir view over an area with large terrain relief, the shape and the pattern of the same feature on the two 2D images can be distorted and the grey scale patterns can be significantly different. For those cases, a reliable template matching is difficult and the tie point search may not find the matching templates, even with a multi-trial strategy.

Initially, interest points (represented as crosses) can be found in the reference image 710 and match points can be found in the sensed image 715. After estimating the epipolar geometry model, the two images can be rectified using an epipolar transformation. Then tie points can be found and filtered in the rectified images. Since both template images are rectified, there is a better chance of matching based on the grey scale pattern.

In this alternate embodiment, interest points are found along scan lines in the reference image as shown in 720. For a given interest point in the reference image, the search region in the sensed image is no longer a square window. The match point should be along the horizontal epipolar line as shown in 725. This reduces the search region to a small buffer along the horizontal epipolar line. Since the images are rectified, the reprojection error is the same as the residual y parallax, and the tie points should have the same order along the scan lines. The ordering constraints, together with the residual y parallax can be used to detect and remove outliers. However, epipolar rectification is a computationally intensive process, and the optional additional time for finding tie points and filtering them is recommended only if the two images have a large parallax between them.

If the reference image or the sensed image includes RPC information, a DEM file can further improve the accuracy of the results. The present invention performs on-the-fly orthorectification and generates tie points in the common ground coordinate space. The image is geometrically corrected for template matching in tie point finding. In tie point geometric filtering using a global transformation, the error is measured in a common ground coordinate space. Radiometric matching and geometric filtering are performed in the common ground coordinate space to improve the reliability and accuracy of tie point generation. The experimental results verify that the higher the resolution and accuracy of the DEM data if available, the more tie points that are generated and the better the distribution of those points. The tie points can be automatically generated even in the image areas with big distortion due to terrain relief, such as mountainous areas.

To compute the image transformation and transform the sensed image, a number of image transformation functions can be used to align the sensed image with the reference image. RST transformation and polynomial transformation are examples of global transformations. Triangulation and spline-based transformation are examples of local transformations. Global transformations are less sensitive to the outlier tie points; however, they typically do not align the images exactly at the tie point locations. Local transformations align the images exactly at the tie point locations, and they should be considered if there are considerable local geometric differences between the images due to variation in terrain relief and imaging view angles. However, the local transformation is sensitive to the outlier tie points and would distort the registered image at the outlier location.

The above described techniques can be utilized in a number of different applications that would benefit from image registration. For example, it is possible to register an image with no or poor georeferencing information to an orthorectified reference image to have it georeferenced or rectified. Similarly, images from different times can be registered for change detection and time series analysis. Images with different modalities can also be registered to integrate complementary information from different sensors and to help a decision-making process or medical diagnosis. Registered images that have overlapping areas can be combined to create a seamlessly mosaicked image. Similarly, images from different frames of a video can be registered for video compression and motion analysis.

It is also possible to perform data extraction once the image registration process has been completed. The system could automatically generate tie points from stereo images to extract DEM information or register images from a sensor or multiple sensors from different viewing angles for 3D modeling of a scene or anatomical structure. Likewise, image matching and retrieval can be performed such that objects can be extracted from an image and used to search and retrieve images from a large database of digital images.

While the above-discussion has described processing steps in a sequential fashion, many of the steps and sub-steps described herein can be parallelized. For example, different grids can be processed in parallel to determine corresponding match points. Similarly, searching within a search window can be parallelized as well.

While certain configurations of structures have been illustrated for the purposes of presenting the basic structures of the present invention, one of ordinary skill in the art will appreciate that other variations are possible which would still fall within the scope of the appended claims.

The invention claimed is:

1. A computer-implemented method of registering plural images using a computer processor and computer memory, wherein computer code stored in the computer memory causes the computer processor to perform the steps of:
   receiving a reference image;
   receiving a sensed image;
   computing an approximate image transformation between the reference image and the sensed image;
   selecting as a search window a subportion of the sensed image;
   generating a transformed search window by applying the approximate image transformation to the search window;
   finding plural candidate tie points by utilizing template matching between a template window of the reference image and the transformed search window, wherein the template window consists of a subportion of the reference image;
   applying radiometric filtering to at least a portion of the plural candidate tie points found by template matching to filter out a number of the plural candidate tie points found by template matching;
   applying geometric filtering to at least a portion of the plural candidate tie points found by template matching to filter out a number of the plural candidate tie points found by template matching;
   computing an image transformation using candidate points of the plural candidate points that were filtered by the radiometric and geometric filtering but not filtered out by the radiometric and geometric filtering; and
   registering a transformed, sensed image with the reference image by transforming the sensed image using the calculated image transformation.

2. The computer-implemented method as claimed in claim 1, wherein the step of computing the approximate image transformation between the reference image and the sensed image comprises extracting map information from at least one of the reference image and the sensed image.

3. The computer-implemented method as claimed in claim 1, wherein the step of computing the approximate image transformation between the reference image and the sensed image comprises calculating the approximate image transformation using at least three manually entered seed tie points.

4. The computer-implemented method as claimed in claim 1, wherein the step of computing the approximate image transformation between the reference image and the sensed image comprises utilizing fast Fourier image matching between the referenced and sensed images.

5. The computer-implemented method as claimed in claim 1, wherein the template window includes a point of interest, and wherein the step of finding plural candidate tie points by utilizing template matching comprises:
  searching in the transformed search window for a match point corresponding to the point of interest in the template window; and
  saving the corresponding match point and the point of interest as a candidate tie point.

6. The computer-implemented method as claimed in claim 5, wherein the step of searching in the transformed search window comprises:
  selecting a similarity measure to select between plural candidate match points in the transformed search window;
  calculating a matching score for each of the plural candidate match points in the transformed search window; and
  selecting the candidate match point with the highest matching score as the match point.

7. The computer-implemented method as claimed in claim 6, wherein the step of selecting a similarity measure to select between plural candidate match points in the transformed search window comprises:
  selecting a first similarity measure when the reference and sensed images have a common modality, and
  selecting a second similarity measure when the reference and sensed images have different modalities, wherein the first and second similarity measures are different.

8. The computer-implemented method as claimed in claim 6, wherein the step of selecting a similarity measure to select between plural candidate match points in the transformed search window comprises:
  determining when the reference and sensed images have a common modality, and
  selecting as the similarity measure, when the reference and sensed images have a common modality, at least one of: a normalized cross-correlation, a cross-correlation, a sum of squared differences, a sum of absolute difference, and a maximum of absolute difference.

9. The computer-implemented method as claimed in claim 6, wherein the step of selecting a similarity measure to select between plural candidate match points in the transformed search window comprises:
  determining when the reference and sensed images have different modalities, and
  selecting as the similarity measure, when the reference and sensed images have different modalities, at least one of: normalized mutual information; mutual information, redundancy and Kullback divergence.

10. The computer-implemented method as claimed in claim 8, wherein the step of determining when the reference and sensed images have a common modality comprises receiving metadata from the reference and sensed images.

11. The computer-implemented method as claimed in claim 9, wherein the step of determining when the reference and sensed images have different modalities comprises receiving metadata from the reference and sensed images.

12. The computer-implemented method as claimed in claim 1, wherein the step of applying geometric filtering to at least a portion of the plural candidate tie points comprises:
  reading metadata information from the reference and sensed images;
  determining a geometric model to use on the at least a portion of the plural candidate tie points based on the read metadata;
  applying the geometric model to the at least a portion of the plural candidate tie points;
  determining reprojection errors of the at least a portion of the plural candidate tie points to which the geometric model has been applied;
  determining whether the reprojection errors of the at least a portion of the plural candidate tie points to which the geometric model has been applied are larger than a threshold; and
  removing from the plural candidate tie points any of the at least a portion of the plural candidate tie points to which the geometric model has been applied that have reprojection errors larger than the threshold.

13. The computer-implemented method as claimed in claim 12, wherein the step of determining the geometric model to use comprises determining that an epipolar geometric model is to be used when the metadata indicates that the sensed and reference images were obtained using a pushbroom sensor and contain Rational Polynomial Coefficient (RPC) information.

14. The computer-implemented method as claimed in claim 12, wherein the step of determining the geometric model to use comprises determining that an epipolar geometric model of a frame camera is to be used when the metadata indicates that the sensed and reference images were obtained using a frame camera.

15. The computer-implemented method as claimed in claim 12, wherein the geometric model is determined to be global transformation-based geometric model when any of the following conditions are true: (1) the metadata indicates that the sensed image was obtained using a frame camera and the reference image was not obtained using a frame camera; (2) the metadata indicates that the reference image was obtained using a frame camera and the sensed image was not obtained using a frame camera; (3) the reference image was obtained using a pushbroom sensor but the sensed image was not obtained using a pushbroom sensor; (4) the sensed image was obtained using a pushbroom sensor but the reference image was not obtained using a pushbroom sensor; (5) the reference image and the sensed image were obtained from pushbroom sensors but at least one of the pushbroom sensors did not receive Rational Polynomial Coefficient (RPC) information; and (6) both the reference image and the sensed image were not obtained from a frame camera and not obtained from a pushbroom sensor.

16. The computer-implemented method as claimed in claim 1, wherein the step of finding plural candidate tie points by utilizing template matching comprises:
  (a) dividing the reference image into corresponding grids;
  (b) selecting plural points of interest in plural grids of the corresponding grids;
  (c) determining a best point of interest of the selected points of interest within one of the corresponding grids;
  (d) determining if a match point exists for the best point of interest within the one of the corresponding grids by computing a matching score;

(e) repeating steps (c)-(d) for a next best point of interest within the one of the corresponding grids if the match point does not exist; and (f) saving the best point of interest and the match point as a candidate tie point if the match point exists.

17. The computer-implemented method as claimed in claim 16, wherein the steps of (c)-(f) are repeated for the plural grids of the corresponding grids.

18. The computer-implemented method as claimed in claim 1, wherein the step of applying geometric filtering to at least a portion of the plural candidate tie points comprises filtering out candidate tie points using plural iterations of a least median of squares estimator, wherein a candidate tie point is filtered out if the candidate tie point has a Sampson distance larger than a threshold in any of the plural iterations.

19. The computer-implemented method as claimed in claim 12, wherein the step of determining the geometric model to use comprises determining that an epipolar geometric model is to be used, the method further comprising the steps of:

rectifying the reference image and the sensed image using an epipolar transformation;

finding interest points along a scan line in the reference image;

finding corresponding candidate match points along a horizontal epipolar line in the sensed image; and removing outlying candidate match points using at least one of ordering constraints and residual y parallax.

20. The computer-implemented method as claimed in claim 5:

wherein finding plural candidate tie points by utilizing template comprises selecting plural points of interest from plural grid cells that divide up the reference image into a grid;

wherein searching in the transformed search window for a match point comprises determining if a respective match point corresponding to each of the plural grid cells distributed across the reference image exists.

21. The computer-implemented method as claimed in claim 20, wherein determining if a respective match point corresponding to each of the plural grid cells distributed across the reference image exists comprises selectively iterating through the plural points of interest in each of the plural grid cells from best to worst until a match point is found for the each of the plural grid cells or no point of interest remains for the each of the plural grid cells.

* * * * *